(12) United States Patent
Kim et al.

(10) Patent No.: US 6,432,857 B2
(45) Date of Patent: *Aug. 13, 2002

(54) DIELECTRIC CERAMIC COMPOSITION, CERAMIC CAPACITOR USING THE COMPOSITION AND METHOD OF PRODUCING THEREOF

(75) Inventors: Jong Hee Kim, Seoul (KR); Shigehiro Fujino; Nobutake Hirai, both of Yokohama (JP)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/822,869

(22) Filed: Mar. 30, 2001

(30) Foreign Application Priority Data

Mar. 31, 2000 (JP) ........................................ 2000-098270

(51) Int. Cl.$^7$ .......................... C04B 35/48; C04B 35/49
(52) U.S. Cl. ...................... 501/136; 501/135; 361/321.5
(58) Field of Search ................................ 501/135, 136, 501/321.5

(56) References Cited

U.S. PATENT DOCUMENTS 5,164,882 A * 11/1992 Kanai et al. ................. 361/321
5,248,640 A * 9/1993 Sano et al. .................. 501/137

* cited by examiner

*Primary Examiner*—David Brunsman
(74) *Attorney, Agent, or Firm*—Lowe Hauptman Gilman & Berner, LLP

(57) ABSTRACT

The present invention provides a dielectric ceramic composition, a capacitor using the composition and the producing method, of having a lower dielectric loss and a stable characteristics in high frequency bandwidth, and enabling to use a base metal or a carbon-based material as an electrode material by allowing sintering at a low temperature, thereby resulting in lower cost. The dielectric ceramic composition according to present invention, is characterized in comprising a main component of formula $Sr_xMg_{1-x}(Xr_yTi_{1-y})O_3$ (where $0.8 \leq x \leq 1$; $0.9 \leq y \leq 1$) to which $MnO_2$ of 0.05–15 wt %, at least one of 0.001–5 wt % selected from the group consisting of $Bi_2O_3$, PbO and $Sb_2O_3$ and a glass component of 0.5–15 wt % are added based on the weight of the main component.

20 Claims, 2 Drawing Sheets

DIELECTRIC CERAMIC COMPOSITION, CERAMIC CAPACITOR USING THE COMPOSITION AND METHOD OF PRODUCING THEREOF

BACKGROUND OF THE INVENTION

The present invention relates to a dielectric ceramic composition, more particular to a dielectric ceramic composition, a ceramic capacitor using the composition and the producing method, thereof having a lower dielectric loss and stable characteristics in high frequency bandwidth, and enabling to use a base metal(e.g. Cu, W etc.) or a carbon-based material as an electrode material by allowing sintering at a low temperature, and thereby reducing the production cost.

Conventionally, a dielectric property of a ceramic provides a ceramic capacitor having larger capacitance and being more miniature in size. The ceramic capacitor may be made of a material selected from $TiO_2$ having a rutile structure, $BaTiO_3$, $MgTiO_3$, $CaTiO_3$ and $SrTiO_3$, having a perovskite structure and the mixture thereof.

This ceramic capacitor may be classified into a platelike type and a laminate type. The platelike type capacitor is produced by forming said material powder into some shaped body, such as pellet(disc), rod(cylinder) or chip(angular), under pressure, sintering the shaped body at 1200° C.–1400° C. to a sintered body, and forming electrode at each surface of the sintered body.

Also, the laminated type ceramic capacitor is produced by mixing said material powder with organic binder and organic solvent to prepare a slurry, forming green sheets from the slurry through a doctor bladding, printing the pattern of electrode comprising of a noble metal, such as Pt and Pd, on each of the green sheets, subsequently laminating said green sheets in the thickness direction under pressure to form a laminate, and sintering the laminate at 1200° C.–1400° C.

As described above, however, in the conventional ceramic capacitor, the sintering process must be performed at a high temperature ranging 1200° C.–1400° C., to obtain the sintered body exhibiting a good electric characteristics and having a high density.

For the laminated ceramic capacitor, particularly, in the case of using a base metal as an electrode material, there has been a problem to oxidize the base metal during the sintering process, which occurs a high resistance layer formation between the ceramic layers. To avoid the problem, the noble metal material, being stable at high temperature, must be employed as an electrode material, thereby resulting in high cost.

On application of a device for high frequency bandwidth, such as microwave, it is preferred to have a low dielectric loss. And such device is required to have a good electric characteristics such as a quality value(Q), temperature property(this term means temperature changing ratio of the capacity), and a high reliability. However, no current dielectric material meets all the conditions.

Accordingly, there has been a need in the art to provide a dielectric ceramic composition, ceramic capacitor using the composition and the producing method to solve the problem as described above.

SUMMARY OF THE INVENTION

It is an object of the present invention to provide a dielectric ceramic composition and a producing method of the dielectric ceramic composition of having a lower dielectric loss and a stable characteristics in high frequency bandwidth, and enabling to use a base metal, such as Cu and W, or a carbon-based material as an electrode material by allowing sintering at a low temperature, thereby reducing the production cost.

To achieve the above object, the present invention provides the dielectric ceramic composition comprising a main component of formula $Sr_xMg_{1-x}(Zr_yTi_{1-y})O_3$ (where $0.8 \leq x \leq 1$; $0.9 \leq y \leq 1$) to which 0.05–15 wt % of $MnO_2$, 0.001–5 wt % of at least one selected from the group consisting of $Bi_2O_3$, PbO and $Sb_2O_3$ and 0.5–15 wt % of a glass component are added based on the weight of the main component.

It is another object of the present invention to provide a ceramic capacitor using the composition and a method of manufacturing the ceramic capacitor.

BRIEF DESCRIPTION OF THE DRAWINGS

The present invention will become more fully understood from the detailed description given hereinbelow and the accompanying drawings which are given by way of illustration only, and thus, are not limitative of the present invention and wherein.

DETAILED DESCRIPTION OF THE INVENTION

Figure 1:
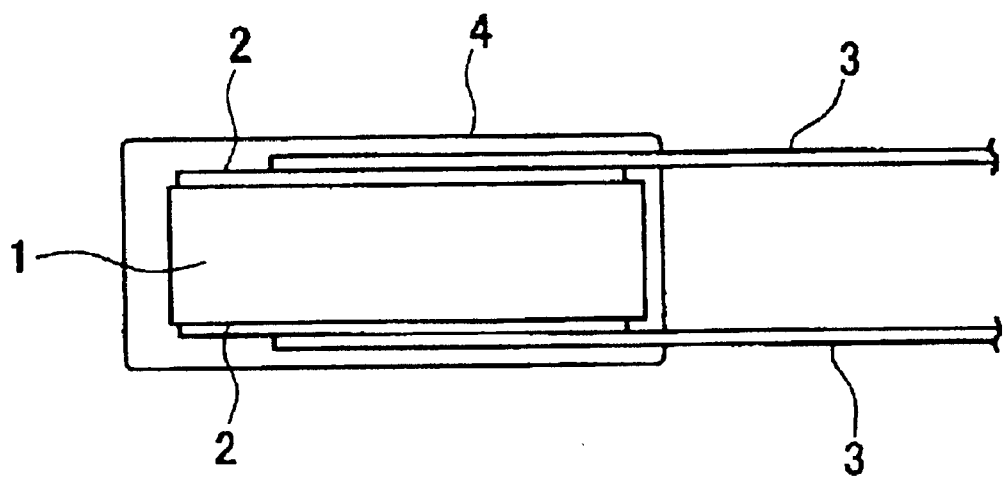
FIG. 1 illustrates cross-sectional structural views of a platelike ceramic capacitor in accordance with example 1.

According to the present invention, the dielectric ceramic composition is characterized in comprising a main component of formula $Sr_xMg_{1-x}(Zr_yTi_{1-y})_3$ (where $0.8 \leq x \leq 1$; $0.9 \leq y \leq 1$), to which $MnO_2$ of 0.05–15 wt %, at least one of 0.001–5 wt % selected from the group consisting of $Bi_2O_3$, PbO and $Sb_2O_3$, and a glass component of 0.5–15 wt % are added based on the weight of the main component.

In the preferred embodiment, the dielectric ceramic composition is produced by adding $MnO_2$ of 0.5–15 wt %, at least one of 0.001–5 wt % selected from the group consisting of $Bi_2O_3$, PbO and $Sb_2O_3$ and a glass component 0.5–15 wt % based on the weight of the component to a main component of formula $Sr_xMg_{1-x}(Zr_yTi_{1-y})O_3$ (where $0.8 \leq x \leq 1$; $0.9 \leq y \leq 1$). The resulting composition can exhibit a high dielectric constant, a good temperature property and a high quality value(Q). As a result, the dielectric ceramic composition is suitable for using at high frequency bandwidth.

The mole fraction of Sr is preferably 0.8(80 mol %) or more, when the composition containing Sr of less than 0.8 is fired at 925° C.–1080° C. The sintering property of the resultant is deteriorated.

The mole fraction of Ti is preferably 0.1(10 mol %) or less. When the mole fraction of Ti is more than 0.1, the temperature property as well as the quality factor(Q) are deteriorated.

$MnO_2$ is added to the main component as a sintering aid agent for enabling to sinter at a low temperature. The amount of the agent is preferably 0.05–15 wt %. When the amount of $MnO_2$ is less than 0.05 wt %, it does little function as an additive, resulting in a lower density of the sintered body. When the amount of $MnO_2$ is more than 15 wt %, the quality value is deteriorated.

A metal oxide having a low melting point is added to the main component for improving the temperature property.

al may be at least one selected from the group consisting of $Bi_2O_3$, PbO and $Sb_2O_3$. The additive amount is preferably 0.001–5 wt %. When the additive is less than 0.001 wt %, the temperature property cannot be improved. When the additive is more than 5 wt %, the quality value is deteriorated.

The glass component is added thereto as a sintering aid agent for enabling to sinter at a low temperature. The additive amount is preferably 0.5–15 wt %. When the glass component is less than 0.5 wt %, the temperature property cannot be improved. When the glass component is more than 15 wt %, the quality value is deteriorated.

The glass component employed in the present invention preferably has a good wettability to the main component $Sr_xMg_{1-x}(Zr_yTi_{1-y})O_3$ (where $0.8 \leq x \leq 1$; $0.9 \leq y \leq 1$) and is softened and/or melted at 925–1080° C. Specifically, such glass component may be ZnO—$SiO_2$ based glass or $Li_2O$—$Al_2O_3$—$SiO_2$ based glass.

In second embodiment of the present invention, $SiO_2$ of 0.01–5 wt % and $Al_2O_3$ of 0.01–5 wt % based on the weight of the main component are further added to the dielectric ceramic composition to provide another dielectric ceramic composition.

$SiO_2$ is used as an additive for improving the temperature property. The amount of $SiO_2$ is preferably about 0.01–5 wt %. When the amount of $SiO_2$ is less than 0.01 wt %, the temperature property cannot be improved. When the amount of $SiO_2$ is more than 5 wt %, the quality value is deteriorated.

$Al_2O_3$ is used as an additive for improving the quality value. The amount of $Al_2O_3$ is preferably about 0.01–5 wt %. When the amount of $Al_2O_3$ is less than 0.01 wt %, the quality value cannot be improved. When the amount of $Al_2O_3$ is more than 5 wt %, the temperature property is deteriorated.

In the third embodiment of the present invention, a rare earth oxide of 0.001–2 wt % is further added to the dielectric ceramic composition to provide another dielectric ceramic composition based on the weight of the main component.

The rare earth oxide is used as an additive for improving the temperature property. Preferably, the amount of the rare earth oxide is about 0.001–2 wt %. When the amount of the rare earth oxide is less than 0.001 wt %, the temperature property cannot be improved. When the amount of the rare earth oxide is more than 2 wt %, the quality value is deteriorated.

The rare earth oxide employed in the present invention has preferably a good wettability to the main composition $Sr_xMg_{1-x}(Zr_yTi_{1-y})O_3$ (where $0.8 \leq x \leq 1$; $0.9 \leq y \leq 1$) and has a grain boundary layer, which is used to improve the sintering property. Specifically, such rare earth oxide may include at least one selected from the group consisting of $La_2O_3$, $CeO_2$, $Pr_6O_{11}$, $Nd_2O_3$, $Sm_2O_3$, $Dy_2O_3$, $Ho_2O_3$, $Er_2O_3$, $Tm_2O_3$ and $Yb_2O_3$.

Also the present invention provides a ceramic capacitor with the opposed surfaces comprising one of the dielectric ceramic compositions as described above, each of which an electrode is formed on. The electrode of the ceramic capacitor may be base metal or carbon-based material, since the capacitor can be produced through sintering at the low temperature.

Further, the present invention provides a ceramic capacitor made by laminating alternatively electrodes and sheets comprising one of the dielectric ceramic compositions as describe above.

The ceramic capacitor according to the present invention exhibits a lower dielectric loss and stable characteristics, by using one of the dielectric ceramic compositions as describe above. Therefore, the ceramic capacitor is expected to have more improved reliability. Moreover, it is advantageous that the dielectric ceramic composition can be sintered at a low temperature of 925–1080° C. Therefore, an inexpensive metal, such as a base metal and a carbon-based material, can be used as an internal electrode, thereby reducing the production cost.

The base metal having a good conductibility and a high reliability is preferably employed as the electrode, which may be at least one selected from the group consisting of Cu, Ni, W and Mo, and the carbon-based material employed as the electrode may be carbon(amorphous), graphite or the mixture.

In present invention, a ceramic capacitor fabricating method comprises the steps of forming powder comprising a main component of formula $Sr_xMg_{1-x}(Zr_yTi_{1-y})O_3$ (where $0.8 \leq x \leq 1$; $0.9 \leq y \leq 1$), to which $MnO_2$ of 0.05–15 wt %, at least one of 0.001–5 wt % selected from the group consisting of $Bi_2O_3$, PbO and $Sb_2O_3$, and a glass component of 0.5–15 wt % are added based on the weight of the main component, into a bulk or a sheet; and sintering the bulk or a sheet at about 925–1080° C.

According to the method, a sintering aid agent of $MnO_2$ and glass composition can improve a wettability of a grain boundary layer to bind powder particles and reduce the void fraction during the sintering process even at low temperature of about 925–1080° C. Thus, the sintered body having a high strength and high density can be obtained at the low temperature.

In another embodiment of the present method, the method may comprise the additional step of providing an electrode on a main surface of the sheet; laminating the sheet in the thickness direction under pressure to form a laminate; and sintering the laminate at about 925–1080° C.

According to this method, a base metal, such as Cu and Ni, or a carbon-based material, such as amorphous carbon and graphite, is used as an internal electrode, which is less expensive than noble metal, such as Pt and Pd, resulting in the lower cost without deteriorating the characteristics.

The embodiments of the present invention will now be described by way of example.

EXAMPLE 1

Referring to FIG. 1, cross-sectional structural view of a platelike ceramic capacitor in accordance with a first example is shown in FIG. 1. The capacitor comprises a bulk shape dielectric body 1, terminal electrodes 2 formed on the opposed surfaces of the dielectric body 1, lead lines 3 connecting to the terminal electrode, and an epoxy resin 4 encapsulating the dielectric body 1 and the terminal electrode 2.

The dielectric body 1 is made of a dielectric ceramic composition comprising a main component of formula $Sr_xMg_{1-x}(Zr_yTi_{1-y})O_3$ (where $0.8 \leq x \leq 1$; $0.9 \leq y \leq 1$), to which $MnO_2$ of 0.05–15 wt %, at least one of 0.001–5 wt % selected from the group consisting of $Bi_2O_3$, PbO and $Sb_2O_3$ and a glass frit(glass component) of 0.5–15 wt % are added based on the weight of the main component.

The dielectric body 1 may include one of to the dielectric ceramic composition further containing $SiO_2$ of 0.01 . 5 wt % and $Al_2O_3$ of 0.01–5 wt %, the dielectric ceramic composition further containing a rare earth oxide of 0.001–2 wt %, and the dielectric ceramic composition further containing $SiO_2$ of 0.01–5 wt %, $Al_2O_3$ of 0.01–5 wt % and rare earth oxide of 0.001–2 wt %.

The terminal electrode 2 comprises a conductive material having a high reliability, such as Ag and Ag alloy. Preferably, Ag alloy may include 90 Ag–10 Pd. The material of the terminal electrode 2 may also include at least one selected from the group consisting of Cu, Ni, W and Mo, or carbon, graphite or the mixture.

This ceramic capacitor exhibits a stable dielectric constant ($\epsilon$), quality factor(Q) and temperature property (Tc) even in high frequency bandwidth.

The method of manufacturing this capacitor will now be described.

Each of Powdered SMZT, $MnO_2$, at least one selected from the group consisting of $Bi_2O_3$, PbO and $Sb_2O_3$, glass frit, $SiO_2$, $Al_2O_3$ and rare earth oxide were weighed as the predetermined amount.

In this example, each of powdered $Sr_{0.95}Mg_{0.05}(Zr_{0.95}Ti_{0.05})O_3$, $MnO_2$, PbO, glass component(ZnO—$SiO_2$ based glass or $Li_2O$—$Al_2O_3$—$SiO_2$ based glass), $SiO_2$, $Al_2O_3$ and $La_2O_3$ was weighed to prepare a dielectric ceramic composition as shown in Table 1.

The prepared components were wet-milled with water(or organic solvent such as ethanol and acetone) in ball mill for predetermined time, such as 24 hours. The resultant mixture was dehydrated(or removal of the solvent, such as ethanol and acetone) and dried. Specimen comprising different composition from thereof the present invention was prepared as comparison(indicated by ※ in the Table 1).

Then, the dried mixture was preliminary fired at 550–750° C., for 0.5–5.0 hours, followed by pulverizing for 1–24 hour with a mortar machine(or automatic pestle) to obtain the fired powder having the desired granularity.

Subsequently, an appropriate amount of an organic binder was added to the fired powder. The resultant was mixed and granularized uniformly using a mortar machine and a like to obtain granular powder having the desired granularity. Polyvinyl alcohol(PVA) was employed as a organic binder. Other organic binder may include ethylcellulose aqueous solution and acryl resin solution(acryl binder).

Then, the pellet having a diameter of 20 mm and a thickness of 0.5 mm is formed from the granular powder using a forming machine, followed by firing at 925–1080° C., for 0.5–10 hours under atmosphere, to obtain a disk-shaped dielectric body 1.

The composition of the present invention was fired at the other temperature to prepare another specimen as comparison(indicated by "※" in the Table 1).

Table 2 shows electric characteristics of each specimen, and the comparison is indicated by "※".

TABLE 1

| Specimen | Main component (mole fraction) $Sr_xMg_{1-x}(Zr_yTi_{1-y})O_3$ | | | | Additive A (wt %) | | | Additive B (wt %) | | | Sintering temperature (° C.) |
|---|---|---|---|---|---|---|---|---|---|---|---|
| | Sr | Mg | Zr | Ti | $MnO_2$ | $Al_2O_3$ | $SiO_2$ | Glass frit | PbO | $La_2O_3$ | |
| 1※ | 1 | 0 | 1 | 0 | 0 | 0 | 0 | 0 | 0 | 0 | 1050 |
| 2 | 1 | 0 | 1 | 0 | 0.3 | 0 | 0 | 0.5 | 1.0 | 0 | 1000 |
| 3 | 1 | 0 | 1 | 0 | 0.3 | 0 | 0 | 3.0 | 1.0 | 0 | 950 |
| 4※ | 1 | 0 | 1 | 0 | 0.3 | 0 | 0 | 11.0 | 1.0 | 0 | 950 |
| 5 | 1 | 0 | 0.95 | 0.05 | 5.0 | 0.1 | 0.05 | 2.5 | 0.5 | 0.01 | 950 |
| 5 | 1 | 0 | 0.95 | 0.05 | 5.0 | 0.1 | 0.05 | 2.5 | 0.5 | 0.01 | 1000 |
| 7※ | 1 | 0 | 0.95 | 0.05 | 5.0 | 0.1 | 0.05 | 2.5 | 0.5 | 0.01 | 900 |
| 8※ | 1 | 0 | 0.95 | 0.05 | 5.0 | 0.1 | 0.05 | 2.5 | 6.0 | 0.01 | 950 |
| 9 | 1 | 0 | 0.95 | 0.05 | 5.0 | 0.1 | 0.05 | 2.5 | 0.5 | 0.01 | 950 |
| 10 | 0.98 | 0.02 | 0.95 | 0.05 | 5.0 | 0.05 | 0.05 | 2.5 | 0.5 | 0.01 | 950 |
| 11 | 0.98 | 0.02 | 0.95 | 0.05 | 6.0 | 0.5 | 0.05 | 2.5 | 0.5 | 0.01 | 950 |
| 12※ | 0.98 | 0.02 | 0.95 | 0.05 | 5.0 | 0.5 | 0.05 | 2.5 | 1.0 | 0.01 | 900 |
| 13※ | 0.98 | 0.02 | 0.95 | 0.05 | 5.0 | 0.5 | 0.05 | 11.0 | 1.0 | 0.01 | 950 |
| 14 | 0.98 | 0.02 | 0.95 | 0.05 | 5.0 | 5.0 | 0.05 | 2.5 | 0.5 | 0.01 | 950 |
| 15 | 0.98 | 0.02 | 0.95 | 0.05 | 5.0 | 0.1 | 0.5 | 2.5 | 0.5 | 0.01 | 950 |
| 16※ | 0.95 | 0.05 | 0.95 | 0.05 | 0.04 | 0 | 0 | 3.5 | 0 | 0 | 925 |
| 17※ | 0.95 | 0.05 | 0.95 | 0.05 | 2.5 | 0 | 0 | 0.4 | 0 | 0 | 925 |
| 18 | 0.95 | 0.05 | 0.95 | 0.05 | 2.5 | 0 | 0 | 3.5 | 0 | 0 | 925 |
| 19※ | 0.95 | 0.05 | 0.95 | 0.05 | 3 | 0.2 | 0.3 | 0.4 | 0.5 | 0.00 | 950 |
| 20※ | 0.95 | 0.05 | 0.95 | 0.05 | 5 | 0.1 | 0.05 | 5 | 0.5 | 0.00 | 900 |
| 21 | 0.95 | 0.05 | 0.95 | 0.05 | 5 | 0.1 | 0.05 | 5 | 0.5 | 0.03 | 950 |
| 22 | 0.95 | 0.05 | 0.95 | 0.05 | 5 | 0.05 | 0.05 | 5 | 0.5 | 0.03 | 975 |
| 23 | 0.95 | 0.05 | 0.95 | 0.05 | 5 | 0.5 | 0.05 | 5 | 0.5 | 0.03 | 975 |
| 24 | 0.95 | 0.05 | 0.95 | 0.05 | 5 | 5.0 | 0.05 | 5 | 0.5 | 0.03 | 975 |
| 25 | 0.95 | 0.05 | 0.95 | 0.05 | 5 | 0.1 | 0.5 | 5 | 0.5 | 0.03 | 975 |
| 26 | 0.95 | 0.05 | 0.95 | 0.05 | 5 | 0.1 | 5.0 | 5 | 0.5 | 0.03 | 975 |
| 27 | 0.95 | 0.05 | 0.95 | 0.05 | 5 | 0.1 | 0.1 | 5 | 0.5 | 0.03 | 1050 |
| 28 | 0.8 | 0.2 | 0.95 | 0.05 | 5 | 0.1 | 0.05 | 3.5 | 0.5 | 0.03 | 950 |
| 29※ | 0.8 | 0.2 | 0.95 | 0.05 | 5 | 0.1 | 0.05 | 5 | 0.5 | 0.03 | 900 |
| 30※ | 0.75 | 0.25 | 0.95 | 0.05 | 5 | 0.1 | 0.05 | 5 | 0.5 | 0.03 | 950 |

※comparison

TABLE 2

| Specimen number | Dielectric constant ($\epsilon$) | Quality value (Q) | Resistance ($\Omega \cdot cm$) | Temperature property (Tc) (ppm/° C.) |
|---|---|---|---|---|
| 1* | 13 | 230 | $1.6 \times 10^{11}$ | 96 |
| 2 | 19 | 950 | $1.3 \times 10^{12}$ | 93 |
| 3 | 23 | 2300 | $1.9 \times 10^{12}$ | 60 |
| 4* | 22 | 380 | $1.5 \times 10^{12}$ | 180 |
| 5 | 28 | 2680 | $1.7 \times 10^{12}$ | 58 |
| 6 | 27 | 3630 | $1.5 \times 10^{12}$ | 63 |

TABLE 2-continued

| Specimen number | Dielectric constant ($\epsilon$) | Quality value (Q) | Resistance ($\Omega \cdot cm$) | Temperature property (Tc) (ppm/° C.) |
|---|---|---|---|---|
| 7* | 24 | 190 | $1.6 \times 10^{12}$ | 56 |
| 8* | 33 | 180 | $1.5 \times 10^{12}$ | 26 |
| 9 | 31 | 6000 | $2.0 \times 10^{12}$ | 35 |
| 10 | 29 | 2670 | $1.8 \times 10^{12}$ | 38 |
| 11 | 27 | 2980 | $1.6 \times 10^{12}$ | 32 |
| 12* | 12 | 310 | $1.5 \times 10^{12}$ | 15 |
| 13* | 28 | 60 | $1.8 \times 10^{12}$ | 27 |
| 14 | 26 | 790 | $1.9 \times 10^{12}$ | 43 |
| 15 | 25 | 2340 | $2.0 \times 10^{12}$ | 36 |
| 16* | 18 | 370 | $1.9 \times 10^{12}$ | 32 |
| 17* | 16 | 270 | $2.1 \times 10^{12}$ | 27 |
| 18 | 23 | 2560 | $1.8 \times 10^{12}$ | 68 |
| 19* | 12 | 320 | $1.6 \times 10^{12}$ | 71 |
| 20* | 17 | 150 | $1.3 \times 10^{11}$ | 29 |
| 21 | 25 | 1700 | $2.2 \times 10^{12}$ | 75 |
| 22 | 25 | 2550 | $2.1 \times 10^{12}$ | 58 |
| 23 | 22 | 2500 | $1.7 \times 10^{12}$ | 82 |
| 24 | 26 | 2700 | $1.1 \times 10^{13}$ | 105 |
| 25 | 24 | 2300 | $1.9 \times 10^{12}$ | 74 |
| 26 | 22 | 1970 | $1.5 \times 10^{12}$ | 23 |
| 27 | 23 | 2200 | $2.1 \times 10^{12}$ | 63 |
| 28 | 17 | 1290 | $2.0 \times 10^{12}$ | 32 |
| 29* | 12 | 200 | $1.8 \times 10^{12}$ | 17 |
| 30* | 11 | 170 | $1.9 \times 10^{12}$ | 40 |

*comparison

Wherein, the dielectric constant($\epsilon$) was measured at 25° C. under the condition of frequency of 1 MHz and an input voltage of 1 $V_{rms}$. The Q value was measured under the condition of frequency of 1 MHz and an input voltage of 1 $V_{rms}$. The temperature property (Tc) was calculated from the following equation $$Tc(ppm° C.)=(C2-C1\times 10^6)/(C1\times(125-25))$$

Wherein, the C1 is the capacitance at 125° C. and the C2 is the capacitance at 25° C.

And the resistance (R($\gamma \cdot cm$)) was calculated by using the voltage and the current, which were measured on applying a direct voltage of 1000 V for 1 minute at 25° C.

Referring to the result of Table 2, the dielectric constant ($\epsilon$), Q value and temperature property (Tc) were stable even at high frequency in this example, while the characteristics of all the comparisons were deteriorated.

Further, when the specimen surfaces of these examples were observed through a metallurgical microscope, it will be known that no void was present at grain boundary and a dense sintering body was constructed.

As described above, according to this example, the dielectric composition exhibiting high dielectric constant, high Q value and good temperature property, can be obtained by adding $MnO_2$ of 0.05–15 wt %, at least one of 0.001–5 wt % selected from the group consisting of $Bi_2O_3$, PbO and $Sb_2O_3$ and a glass frit 0.5–15 wt % to a main component of SMZT based on the weight of the main component and optionally further adding $SiO_2$ of 0.01–5 wt % and $Al_2O_3$ of 0.01–5 wt % and rare earth oxide of 0.001–2 wt % thereto. Thus, the dielectric composition is capable of a dielectric capacitor having stable characteristics and improved reliability.

According to the method of manufacturing the ceramic capacitor, the ceramic capacitor having high density and strength can be provided at the low temperature by forming a bulk or a sheet from powder comprising a main component of ZMZT to which $MnO_2$ of 0.05–15 wt %, at least one 0.001–5 wt % selected from the group consisting of $Bi_2O_3$, PbO and a glass component of 0.5–15 wt % are added based on the weight of the component, and which optionally $SiO_2$ of 0.01–5 wt % and $Al_2O_3$ of 0.01–5 wt % and rare earth oxide of 0.001–2 wt % are added thereto and firing the sheet or other resultant at 925–1080° C.

EXAMPLE 2

Figure 2:
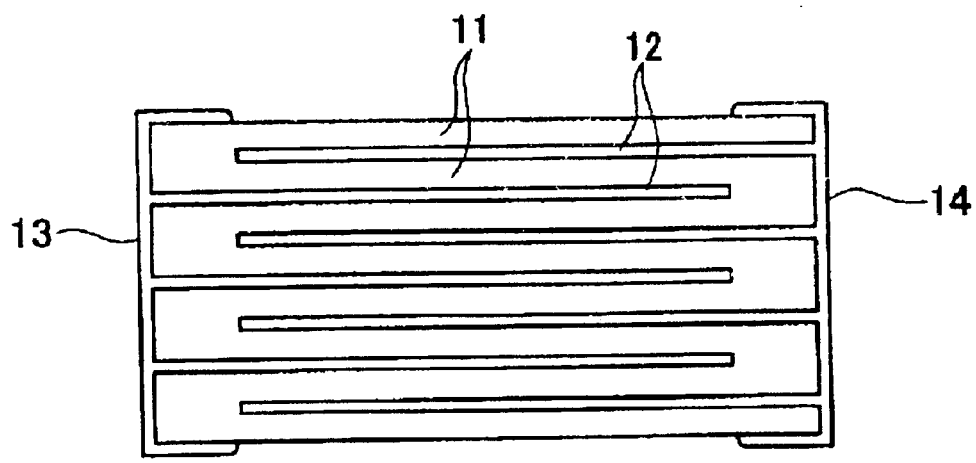
FIG. 2 illustrates cross-sectional structural views of a laminated ceramic capacitor in accordance with example 2.

FIG. 2 illustrates cross-sectional structural view of a laminated ceramic capacitor in accordance with second example. The capacitor comprises a sheet-shaped dielectric layers 11, thin internal electrodes 12 and terminal electrodes 13, 14. This laminated ceramic capacitor is comprised of eight dielectric layers 11 and seven thin internal electrodes 12, which are alternatively laminated.

The dielectric layer 11 is made of sheet-shaped ceramic composition comprising a main component of SMZT to which $MnO_2$ of 0.05–15 wt %, at least one of 0.001–5 wt % selected from the group consisting of $Bi_2O_3$, PbO and $Sb_2O_3$ and a glass frit(glass component) of 0.5–15 wt % are added based on the weight of the main component.

Alternatively, the dielectric layer 11 may include one of the dielectric ceramic composition further containing $SiO_2$ or 0.01–5 wt % and $Al_2O_3$ of 0.01–5 wt %, the dielectric ceramic composition further containing rare earth oxide of 0.001–2 wt %, and the dielectric ceramic composition further containing $SiO_2$ of 0.01–5 wt %, $Al_2O_3$ of 0.01–5 wt % and rare earth oxide of 0.001–2 wt % is added.

The internal electrode 12 and the terminal electrodes 13, 14 include a conductive material having high reliability, for example, Cu, Ni, W and Mo, or carbon, graphite or the mixture.

This laminated ceramic capacitor exhibits a stable dielectric constant($\epsilon$), quality factor(Q) and temperature property (Tc) even in RF region.

The method of manufacturing this laminated ceramic capacitor will be described now.

Each of powdered SMZT, $MnO_2$, at least one selected from the group consisting of $Bi_2O_3$, PbO and $Sb_2O_3$, glass frit, $SiO_2$, $Al_2O_3$ and rare earth oxide were weighed as the predetermined amount. Each composition was wet-milled with water(or organic solvent such as ethanol and acetone) in ball mill for predetermined time, such as 24 hours. The resultant mixture was dehydrated(or removal of the solvent, such as ethanol and acetone) and dried. Specimens comprising different compositions from thereof the present invention were prepared as comparisons(indicated by ✕ in Table 1).

Then, an appropriate amount of an organic binder was added to the dried powder. Subsequently, the resultant powder was mixed using a mortar machine, a mixing mill and a like to obtain a slurry having desired viscosity. Polyvinyl alcohol(PVA) was employed as the organic binder. Other organic binder may be employed, such as ethylcellulose aqueous solution and acryl resin solution (acryl binder).

Then, the slurry was deaired and formed into sheets through doctor blading to obtaining a ceramic green sheet. A conductive paste was printed as desired pattern on the green sheet. Thereby the internal electrode layer was formed on the green sheet. The conductive paste may include alloy containing at least one selected from a group consisting of Cu, Ni, W and Mo, or carbon, graphite or a mixture.

Particularly, the conductive paste employed in present invention may be a carbon paste made from a mixture powder of a carbon powder and a graphite powder, W paste and Mo paste, as well as a Cu paste, which is obtained by adding organic binder, dispersing agent, organic solvent and, if necessary, reducing agent, to Cu powder and then mixing thereof.

Then, the green sheets were laminated in the thickness direction under pressure to form a laminate, followed by firing at 925–1080° C., under inert gas atmosphere, such as $N_2$ gas, or $N_2$—$H_2$ reductive atmosphere. Each terminal electrode was formed on the opposed sides of the laminate. Thus, the laminated ceramic capacitor can be produced through the step of laminating alternatively the dielectric layer 11 and the internal electrode 12.

As described above, for the laminated ceramic capacitor according to this example, it can exhibit high dielectric constant, high Q value and good temperature property, since it is comprised of the composition obtained by adding $MnO_2$ of 0.05–15 wt %, at least one of 0.001–5 wt % selected from the group consisting of $Bi_2O_3$, PbO and $Sb_2O_3$ and a glass frit of 0.5–15 wt % to a main component of SMZT based on the weight of the component and optionally further adding 0.01–5 wt % of $SiO_2$ and 0.01–5 wt % of $Al_2O_3$ and 0.001–2 wt % of rare earth oxide thereto. Thus, the laminated ceramic capacitor is capable of exhibiting stable characteristics and improved reliability in high frequency.

According to the method of manufacturing the laminated ceramic capacitor, the laminated ceramic capacitor having high density and strength can be produced by forming the internal electrode on the green sheet comprising a main component of SMZT to which $MnO_2$ of 0.05–15 wt %, at least one of 0.001 . 4 wt % selected from the group consisting of $Bi_2O_3$, PbO and $Sb_2O_3$ and a glass component of 0.5–15 wt % are added based on the weight of the component, and which optionally 0.01–5 wt % of $SiO_2$ and 0.01–5 wt of $Al_2O_3$ and 0.001–2 wt % of rare earth oxide are added thereto, laminating the green sheet in the thickness direction to form a laminate, firing the laminate at 925–1080° C. under inert gas atmosphere or $N_2$—$H_2$ reductive atmosphere. Thus, an inexpensive base metal and carbon-based material can be used as an electrode material, in lie of a noble metal, such a Pt or Pd, since the laminated ceramic capacitor is produced by the process of firing at relatively low temperature. Therefore, the manufacturing method according to the present invention can realize the lower cost without deteriorating the characteristics.

As described above, according to the dielectric ceramic composition of the present invention, the dielectric composition is produced by adding $MnO_2$ of 0.05–15 wt %, at least one 0.001–5 wt % selected from the group consisting of $Bi_2O_3$, PbO and $Sb_2O_3$ and glass frit of 0.5–15 wt %, to a main component of SMZT based on the weight of the component and optionally further adding 0.01–5 wt % of $SiO_2$ and 0.01–5 wt % of $Al_2O_3$ and 0.001–2 wt % of rare earth oxide thereto. Thus, the dielectric composition can exhibit high dielectric constant, high Q value and good temperature property, resulting in the stable characteristics and improved reliability at high frequency region, such as microwave.

For a ceramic capacitor, according to the present invention, the capacitor can exhibit a low dielectric loss even at high frequency bandwidth, since it is made of the dielectric ceramic composition. Therefore, the present capacitor is suitable for RF device. The present capacitor can also realize the lower cost without deteriorating the characteristics, since an inexpensive base metal or carbon-based material can be used as an electrode material due to the low sintering temperature of 925–1080° C.

While the invention has been described in its preferred embodiments, this should not be construed as limitation on the scope of the present invention and can be modified and changed to other various embodiments. Accordingly, the scope of the present invention should be determined not by the embodiments illustrated, but by the appended claims and their legal equivalents. In second example, eight dielectric layers and seven internal electrodes are laminated to form a laminate, but the number of the dielectric or internal electrode may be changed to be suitable for the desired capacitor and characteristics.

What is claimed is:

1. A dielectric ceramic composition, comprising a main component of formula $Sr_xMg_{1-x}(Zr_yTi_{1-y})O_3$ (where $0.8 \leq x < 1$; $0.9 \leq y \leq 1$), $MnO_2$ of 0.05–15 wt %, at least one of 0.001–5 wt % selected from the group consisting of $Bi_2O_3$, PbO and $Sb_2O_3$, and a glass component of 0.5–15 wt %, based on the weight of the main component.

2. The dielectric ceramic composition according to claim 1, further comprising $SiO_2$ of 0.01–5 wt % and $Al_2O_3$ of 0.01–5 wt %.

3. The dielectric ceramic composition according to claim 2, further comprising a rare earth oxide of 0.001–2 wt %.

4. The dielectric ceramic composition according to claim 3, wherein the glass component is ZnO—$SiO_2$ based glass or $Li_2O$—$Al_2O_3$—$SiO_2$ based glass.

5. The dielectric ceramic composition according to claim 3, wherein the rare earth oxide is at least one selected from the group consisting of $La_2O_3$, $CeO_2$, $Pr_6O_{11}$, $Nd_2O_3$, $Sm_2O_3$, $Dy_2O_3$, $HO_2O_3$, $Er_2O_3$, $Tm_2O_3$, and $Yb_2O_3$.

6. A ceramic capacitor comprising:
  a ceramic body of the dielectric ceramic composition according to claim 3, and
  electrodes formed respectively on opposed surfaces of the ceramic body.

7. The dielectric ceramic composition according to claim 2, wherein the glass component is ZnO—$SiO_2$ based glass or $Li_2O$-$Al_2O_3$—$SiO_2$ based glass.

8. A ceramic capacitor comprising:
  a ceramic body of the dielectric ceramic composition according to claim 2; and
  electrodes formed respectively on opposed surfaces of the ceramic body.

9. The dielectric ceramic composition according to claim 1, further comprising a rare earth oxide of 0.001–2 wt %.

10. The dielectric ceramic composition according to claim 9, wherein the glass component is ZnO—$SiO_2$ based glass or $Li_2O$—$Al_2O_3$—$SiO_2$ based glass.

11. The dielectric ceramic composition according to claim 9, wherein the rare earth oxide is at least one selected from the group consisting of $La_2O_3$, $CeO_2$, $Pt_6O_{11}$, $Nd_2O_3$, $Sm_2O_3$, $Dy_2O_3$, $HO_2O_3$, $Er_2O_3$, $Tm_2O_3$, $Yb_2O_3$.

12. A ceramic capacitor comprising:
  a ceramic body of the dielectric ceramic composition according to claim 9; and
  electrodes formed respectively on opposed surfaces of the ceramic body.

13. The dielectric ceramic composition according to claim 1, wherein the glass component is ZnO—$SiO_2$ based glass or $Li_2O$-$Al_2O_3$—$SiO_2$ based glass.

14. A ceramic capacitor comprising:
  a ceramic body of the dielectric ceramic composition according to claim 13; and
  electrodes formed respectively on opposed surfaces of the ceramic body.

15. A ceramic capacitor comprising:
a ceramic body of the dielectric ceramic composition according to claim 1; and
electrodes formed respectively on opposed surfaces of the ceramic body.

16. The ceramic capacitor according to claim 15, wherein said electrode is base metal or carbon-based material.

17. A ceramic capacitor comprising:
a plurality of sheets of dielectric ceramic composition according to claim 1; and
a plurality of electrodes on each of sheets,
wherein the sheets and the electrodes are alternatively laminated.

18. The ceramic capacitor according to claim 17, wherein said electrode is base metal or carbon-based material.

19. A method of producing a dielectric ceramic composition, comprising the steps of
forming a bulk or a sheet with powder including a main component of formula $Sr_xMg_{1-x}(Zr_yTi_{1-y})O_3$ (where $0.8 \leq x < 1$; $0.9 \leq y \leq 1$), to which $MnO_2$ of 0.05–15 wt %, at least one of 0.001–5 wt % selected from the group consisting of $Bi_2O_3$, $PbO$ and $Sb_2O_3$ and glass component 0.5–15 wt % are added based on the weight of the main component; and
firing the bulk or the sheet at 925–1080° C.

20. The method according to claim 19, further comprising:
providing an electrode on a main surface of the sheet;
laminating the sheet in the thickness direction under pressure to form a laminate; and firing the laminate at 925–1080° C.

* * * * *